R. E. WHITCHER.
PLOW.
APPLICATION FILED JUNE 26, 1911.
1,020,240.
Patented Mar. 12, 1912.
2 SHEETS—SHEET 2.
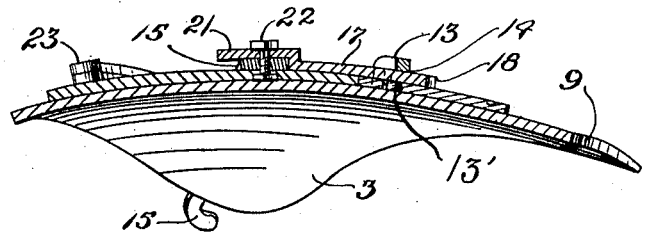
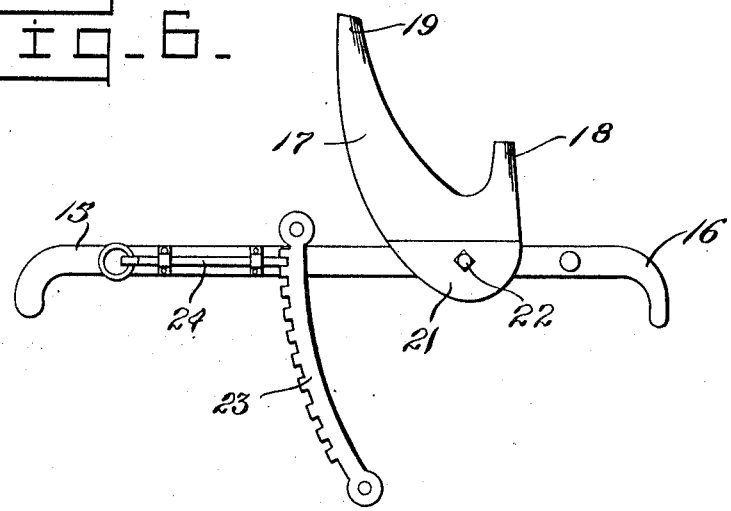
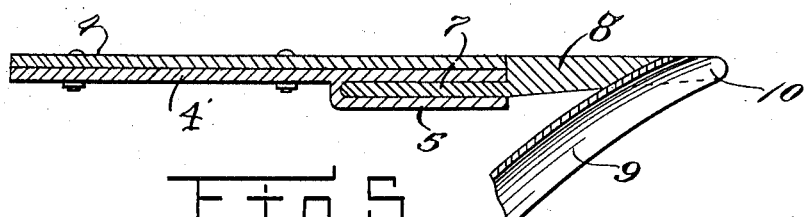
Witnesses
Charles J. MacCarter
H. K. Parsons
Inventor
Rupert E. Whitcher
By Harry Ellis Chawalu
Attorney

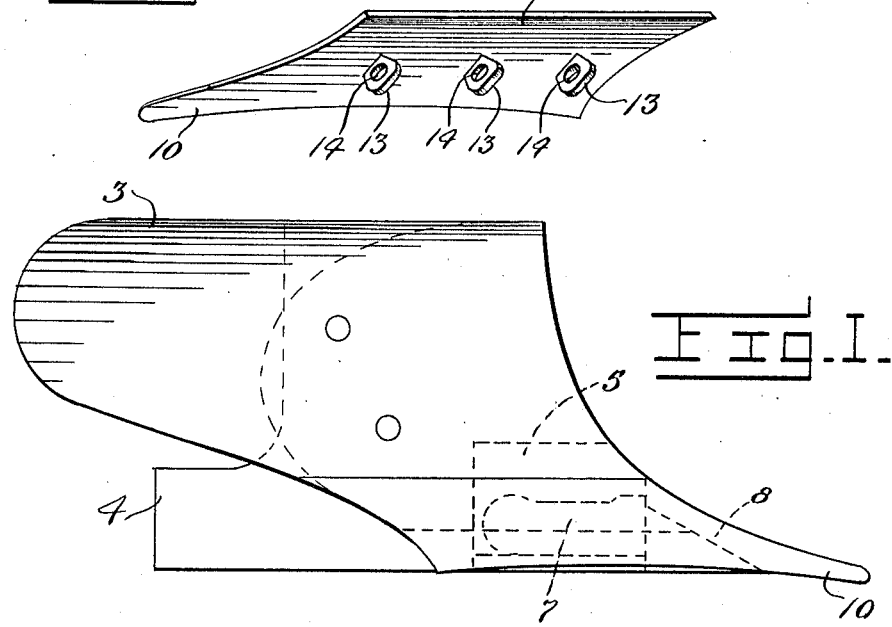
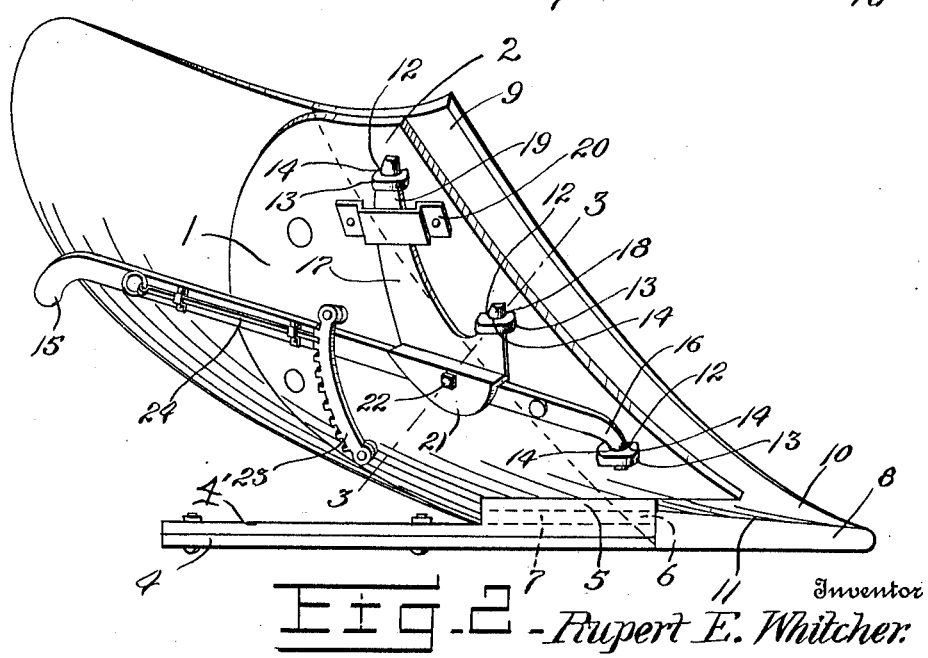

UNITED STATES PATENT OFFICE.

RUPERT E. WHITCHER, OF KEELER, SASKATCHEWAN, CANADA.

PLOW.

1,020,240.   Specification of Letters Patent.   Patented Mar. 12, 1912.

Application filed June 26, 1911. Serial No. 635,283.

*To all whom it may concern:*

Be it known that I, RUPERT E. WHITCHER, subject of King of England, residing at Keeler, in the district of Moose Jaw and Province of Saskatchewan, Canada, have invented certain new and useful Improvements in Plows, of which the following is a specification.

My invention relates to improvements in plows, and has for its leading object the provision of an improved share and plow point which may be quickly and easily secured in position or detached from the plow without the employment of bolts or other similar fastening devices.

A further object of the invention is the provision of improved means for securing a plow share to the mold board, which means will permit of the ready attachment or detachment of the shares while doing away with bolts or similar fastenings which are liable to become jammed in position and thus to be extremely difficult of removal.

Other objects and advantages of my improved plow will be apparent from the following description taken in connection with the drawings, and it will be understood that I may make any changes or modifications in the specific structure shown and described within the scope of the claims without departing from or exceeding the spirit of my invention.

Figure 1 represents a side elevation of my improved plow. Fig. 2 represents a bottom plan view thereof. Fig. 3 represents a longitudinal sectional view on the line 3—3 of Fig. 2. Fig. 4 represents a detailed view of the share removed. Fig. 5 represents a sectional view of the land side and removable point carried thereby, and Fig. 6 represents a detailed view of the locking lever.

In the drawings, the numeral 1 designates the frog of the plow to which is bolted the mold board 3, and the land side 4 of the plow, said frog having the front end of the land side portion 4' thereof slightly enlarged or thickened as at 5 and having the socket 6 formed therein to engage the tenon 7 of the triangular shaped removable plow point 8 which projects forward as a continuation of the land side and has its outer face in alinement with the face of the land side.

The frog 1 has a portion 2 which projects forwardly and downwardly beyond the forward edge of the mold board, and formed in the said portion 2 of the frog are the slots 12 through which pass the rounded lug 13 having tenons 13' engaged in sockets formed in the share 9. Said share 9 has a forwardly projecting point 10 with an inclined side 11 resting against the point 8, whereby when the share is secured in position the inclined edge 11 will so engage the point 8 as to absolutely prevent the forward movement of the point 8 out of the socket 6. The lugs 13 of the share have the apertures 14 formed therein to receive the locking members. To engage the lugs and thus to secure the share in position, I pivot to the forward portion 3 of the frog the metal lever 15, said lever having an integral curved point or hook member 16 formed on its forward end, the pivotal movement of the lever serving to pass the member 16 through one of the apertures 14 of a lug 13 and thus to absolutely prevent the withdrawing movement of said lug. To secure the other lugs 13 in position, I employ the J-shaped member 17 having a short arm 18 and a longer arm 19 for engaging a pair of lugs 13, a guide 20 being secured to the under side of the frog for guiding the movement of the arm 19 and thus retaining the member 17 in position when moved out of engagement with the lugs. To control the movement of said J-shaped plate and to cause it to be shifted in unison with the locking member 16, I form on the member 17 the offset ear 21 which is pivotally secured to the lever 15 by the bolt 22, the said ear being secured to the lever above its point of pivotance, whereby the members 16 and 17 will be shifted in opposite directions upon the movement of the lever on its pivot. It will thus be seen that to secure my point and share in position it is merely necessary to first insert the tenon of the point in its socket and then place the share with its lugs depending through the frog and then shift the lever 15 to cause the member 16 and arms 18 and 19 of the member 17 to pass through apertures 14 of their respective lugs 13, thus firmly securing the lugs and the share in position upon the frog. To lock the lever in either share retaining or disengaging position, I secure to the mold board the segmental rack plate 23 adapted to be engaged by the locking pawl 24 slidably supported on the lever 15, the engagement of the pawl with the rack locking the lever in adjusted position.

From the foregoing description taken in connection with the drawings, the construction of my improved share securing device for plows will be readily understood, and it will be seen that I have provided a simple and efficient device by which the share can be quickly secured in position or readily removed.

I claim:

1. The combination with a frog having a plurality of apertures formed therein, of a share having depending lugs fitting in said apertures, said lugs having transverse openings formed therein, a lever pivoted to the frog, arms secured to the lever and adapted to fit in the apertures of the lugs when the lever is moved in one direction upon its pivot, and means for locking the lever in desired position.

2. The combination with the frog of a plow having apertures formed therein, of a plow share having depending lugs passing through the apertures, said lugs having transverse openings formed therein, a lever pivoted to the frog and having a hooked lower end for engagement in the opening of one of the lugs, a J-shaped member pivoted to the lever above the point of pivotance of the lever, the arms of said J-shaped member being adapted to be engaged in the openings of the other lugs, and means for securing the lever in adjusted position to retain its end and J member in or out of engagement with the lugs as desired.

In testimony whereof I affix my signature, in the presence of two witnesses.

RUPERT E. WHITCHER.

Witnesses:
S. H. HYSOP,
A. C. NOVE.

---

Copies of this patent may be obtained for five cents each, by addressing the "Commissioner of Patents, Washington, D. C."